3,041,250
AEROBIC FERMENTATION PROCESS
Bernard Wolnak, Chicago, and Leonard F. Barrington, Mundelein, Ill., assignors, by mesne assignments, to Armour and Company, a corporation of Delaware
No Drawing. Filed Jan. 11, 1957, Ser. No. 633,540
21 Claims. (Cl. 195—109)

This invention relates to an aerobic fermentation process, and is particularly useful in the growth of yeast, the production of antibiotics, steroids, and other useful products.

In the present practice of fermentation processes, the problem of sterilizing the apparatus and the material to be employed in the fermentation process is a substantial one and because of the difficulties involved, considerable variation in the production or yields from different batches results. Further, the processes do not lend themselves to the feeding of oxygen at an optimum rate to the microorganisms and in accordance with the demands of the organisms for optimum growth.

An object of the present invention is to provide an effective method for bringing about sterilization of the starting materials in a fermentation process while at the same time utilizing the sterilizing means as a further aid in the supply of oxygen to the materials employed in the fermentation operation. A further object is to provide in the process oxygen in the form of fine bubbles which can be better assimilated or employed in the growth of the yeast or other inoculum. A still further object is to provide an effective process wherein oxygen is provided in a desired form and at a rate best suited for the growing organisms and for meeting the increasing demand for oxygen on the part of the growing organisms. A still further object is to provide a process wherein the rate of growth is effectively controlled by the feeding of nutrient medium containing a sterilizing agent which in turn is employed for supplying oxygen in the process, while also providing an effective means for supplying oxygen independently of the nutrient medium to the materials undergoing fermentation to meet the increasing demands thereof. Yet a further object is to provide a process employing a novel combination of steps whereby yeast containing a larger percentage of nitrogen and in the form of nucleic acid, is obtained. A still further object is the preparation of a yeast cake which is completely free from contaminating organisms, a product which present processes for yeast production are incapable of producing. Other specific objects and advantages will appear as the specification proceeds.

In one phase of our invention, we treat a nutrient medium with hydrogen peroxide to sterilize the medium and thereafter add to the sterilized material catalase, and to the mixture we then add the inoculum. As the microorganisms develop and grow, we continue to add hydrogen peroxide, whose decomposition is catalyzed by the catalase for the production of oxygen. The oxygen supplied is in the form of fine bubbles which provide 100% oxygen at the interface of the organisms so as to increase the rate of utilization of the oxygen by the organisms.

The process is carried on in the usual apparatus providing an open or closed system, a vent for the escape of gases being provided in the closed system, and feed tubes for the feeding of hydrogen peroxide and for the feeding of nutrient medium into the materials undergoing fermentation being provided. It is not essential that air in small amounts be excluded. Since such apparatus is well known in the art, a further description herein is believed unnecessary.

It will be understood that the fermentation process will be carried on under the temperature and pH conditions suitable for the growth of the organism. For example, in the production of yeast (Saccharomyces or Torula), it is found that a desirable temperature is 30° C. and a desirable pH is pH 7.0. This is in contrast with the normal operating pH, which is in the acid range of 4.5 to 5.5. Since the temperatures and pH conditions favorable for the growth of the various microorganisms will vary according to the organism, and since such conditions are well known, a further description herein is believed unnecessary.

After the fermentation is substantially complete, the product may be harvested as in the usual process.

In the foregoing illustrative method, we find that hydrogen peroxide may be added in the quantity of 0.2% to 1% to bring about sterilization of the nutrient medium. Ordinarily, the period of an hour or two will be sufficient to effect sterilization of the material. The hydrogen peroxide is particularly effective in inactivating organisms such as bacteria, and as a result of the thorough sterilization produced in the material, it is found that uniform yields and results can be obtained. For the initial sterilization, we find that the addition of approximately 0.2% of hydrogen peroxide is sufficient for the effective sterilization of the nutrient material.

After the sterilization step, catalase is added and preferably in an amount which will catalyze the efficient decomposition of the hydrogen peroxide, including that subsequently added in the operation of the process. Any suitable catalase, including vegetable or animal catalase, etc., may be used. We prefer to employ liver catalase. After the addition of the catalase, the yeast or other inoculum is added as an aqueous suspension to the medium and catalase. Thereafter, we prefer to add hydrogen peroxide at an increasing rate of input to meet the growing demands for oxygen of the yeast or other material undergoing fermentation. The increasing rate of input of hydrogen peroxide is readily accomplished by the manipulation of a valve in the hydrogen peroxide feed line.

In those systems where sterile air is available, a combination of air and catalase and hydrogen peroxide may be employed, and each singly may be the source of oxygen. For example, catalase and hydrogen peroxide may be used for sterilizing and sterile air and/or catalase and hydrogen peroxide may be used thereafter as the oxygen source. It is possible to use sterile air per se as the oxygen source, following the catalase and hydrogen peroxide sterilization step.

We have also discovered that the nutrient medium which is treated with hydrogen peroxide to sterilize it may be fed continuously or incrementally to the materials undergoing fermentation, the hydrogen peroxide serving the double purpose of sterilizing the incoming medium and also supplying oxygen for the growth of the microorganisms.

By way of illustration, when yeast is the inoculum, we find that substantial yields are obtained when a minimal amount of hydrogen peroxide per liter per hour is employed, this amount being approximately .33 gram. Highly successful results have been obtained where the hydrogen peroxide per liter per hour is in the amount of .66 gram.

The amount of catalase employed should be sufficient to decompose the hydrogen peroxide added to the process. Ordinarily, 100 keil units of catalase per liter is found sufficient. It is, of course, undesirable from an economic standpoint to have a large excess of catalase, but it is desirable to have sufficient catalase to prevent accumulation of the hydrogen peroxide and to supply the amounts of pure oxygen necessary in the process.

In the foregoing operation, we find that the use of hydrogen peroxide at the beginning of the process is of great importance in that the highly effective sterilization produces a uniform product and a high yield. Further, the hydrogen peroxide serves not only the purpose of sterilization, but also is effective in producing oxygen within the apparatus. Further, we find that high yields are obtained through increasing the rate of input of hydrogen peroxide substantially in proportion to the increasing growth of the organisms. In the prior practice, it has been common to add air at a constant rate, thus overlooking the increasing need of the material for more oxygen as fermentation proceeds. In the present process, an excess of oxygen need never be provided, but the oxygen is supplied in accordance with the increasing demands of the organisms, this increase of oxygen being effectively controlled by the setting of the valve in the liquid flow line of the hydrogen peroxide.

In the illustration in which yeast is treated, the resulting product is not only obtained in yields of 35 to 50-fold increases, but the fresh yeastcake produced contains a higher percentage of nitrogen in the form of purines rather than as protein. A yeast with higher nucleic acid content is particularly desired for bakery and yeast-derived products.

The process may be employed for the preparation by fermentation of many products, including yeast; vitamins such as $B_{12}$, riboflavin; citric acid, etc.; antibiotics such as penicillin, streptomycin, aureomycin, terramycin, bacitracin, and similar products. The process may be further employed in the oxygenation of steroids for the production of other steroids, etc.

In all of the fermentation processes, we find that the initial sterilization step in which hydrogen peroxide is employed is extremely effective in the production of uniform results in a high yield, while at the same time the excess hydrogen peroxide is employed in the furnishing of oxygen for the growth of the organisms.

Specific examples of the process may be set out as follows:

Example I

The nutrient medium or propagation mash was composed as follows:

150 g. molasses
1 g. $CaHPO_4$
1 g. $(NH_4)_2HPO_4$
2 g. urea
2 g. $Na_2SO_4$
Tap water, to make one liter The catalase employed was Armour A-100 catalase (100 Keil units per milliliter). The yeast was *Saccharomyces cerevisiae*.

The pH was adjusted to pH 7.0 prior to sterilization. Sterilization of the closed container and contents was accomplished by the introduction of 30% $H_2O_2$ sufficient to make a final $H_2O_2$ concentration of 1%. The mash was allowed to stand at room temperature for approximately two hours to provide complete sterilization. 100 Keil units of catalase were then added to the liter of material. An aqueous suspension of 3 grams of yeastcake (ordinary baking yeast) was then added, and thereafter hydrogen peroxide was added from a reservoir containing 5% hydrogen peroxide. The medium was maintained in a constant temperature bath, with stirring, at 30° C. The hydrogen peroxide was added first at a low initial rate, gradually increasing the amount within 12 hours to 50 ml. per liter per hour.

The fermentation was carried on for a period of 24 hours, the temperature range being between 26° and 34° C., the yeast increase being 3500%. 15% of the catalase was recovered after the harvesting of the product.

The yeastcake, as harvested, was free of contaminating organisms, in contrast to the yeast inoculum which was contaminated with comparatively large numbers of streptococci, lactobacilli and other organisms.

Example II

The process was carried on as described in Example I except that the yeast inoculum was *Troula utilis*. The initial amount of hydrogen peroxide employed in the sterilizing process was 0.2%, and after the addition of the inoculum the rate of input of hydrogen peroxide was increased within 12 hours to 50 ml. per liter per hour. Comparable results to those described in Example I were obtained.

Example III

The process was carried on as described in Example I, except that the inoculum *Saccharomyces lactis* NRRL Y1205 was used and the carbohydrate source was whey. Sterilization of the container and contents was accomplished by heating at 15 lbs. steam pressure for 15 minutes. Then catalase was added, and thereafter hydrogen peroxide was introduced almost continuously through a period of 12 hours, the amount being increased during this period. A minimum amount of hydrogen peroxide per liter per hour employed was .66 gram.

Example IV

In this operation, a propagation mash of the kind described in Example I was employed and the inoculum was *Saccharomyces cerevisiae*. Armour A-100 catalase was employed and the hydrogen peroxide was fed at the rate of .66 gram per liter per hour, the amount being increased during the fermentation operation and the temperature being maintained at about 30° C. A yield of 5000% of yeast was obtained.

Example V

The process was carried out as described in Example I, except that molasses and hydrogen peroxide were continuously added during the operation and without stirring. The added molasses was sterile by reason of the hydrogen peroxide content, and an excellent yield was obtained.

Example VI

The process was carried on as described in Example I, except that 5% hydrogen peroxide was added at rates of 10 ml./liter/hour up to 50 ml./liter/hour over a 24-hour growth period. The low level input of hydrogen peroxide at the beginning of the process, and the increase thereof through the process, resulted in an excellent yield.

Example VII

The process was carried on as described in Example I, except that a Fermco catalase having a stated activity of 800 Saret units per ml. was employed. While the catalase appeared to have a turnover rate lower than that of the Armour catalase, a substantial increase in the growth of yeast was obtained.

Example VIII

This is a process for the production of riboflavin by using *Eremothecium ashbyii* in a medium containing 10% peptone, 0.1 to 10% protein and about 0.5% to 2% glucose, .05% potassium acid phosphate, .05% magnesium sulphase, .15% sodium chloride, .001% ferrous sulphate and .5% corn oil, in addition to catalase. Prior to inoculation, the medium is sterilized with .2% hydrogen peroxide by weight, and the initial pH was brought to 7.5. Hydrogen peroxide was added during the cultivation of the organism to supply oxygen in amounts increasing from .03 to .3 cubic foot per square foot of mash surface as the run proceeded. The vitamin was produced in yields in the amount of 1 milligram per milliliters of culture medium.

Example IX

The production of citric acid by *Aspergillus niger*, grown on a medium including 7% molasses, 1 to 2% potassium acid phosphate, .25 to .50% magnesium sulphate, and trace metals. Prior to inoculation with the organism, .2% hydrogen peroxide by weight was used to sterilize the medium. The pH was adjusted to 7.0. Catalase was added and hydrogen peroxide was introduced to supply .2 to 1 liter of oxygen per liter of medium per minute. After five days' cultivation, 30% of the available sugar was converted to citric acid.

*Example X*

In a process for the production of vitamin $B_{12}$-like products by the use of *Streptomyces griseus*, a medium was prepared containing 1 lb. of beef peptones per 40 liters of mash. In the same medium, 3 lbs. of casein hydrolysate, 1.5 lbs. of sodium chloride, 5 lbs. of ferrous sulphate, .1 liter soybean oil, and 10 parts per million of cobalt nitrate were added to 30 liters of water. The medium was sterilized by treatment with 1% hydrogen peroxide by volume overnight. Catalase was added and the inocula was introduced. The fermentation proceeded at 28 to 32° C. for 24 to 48 hours. Hydrogen peroxide was added at a rate to supply oxygen at 200 to 1000 cu. ft. per hour. The broth was filtered and the filtrate contained .1 to 1 micrograms $B_{12}$ activity per liter.

*Example XI*

In the production of penicillin G, *Penicillium chryoogenum* $Q_{176}$ was grown from a medium containing 40 ml. corn steep liquor per liter, 27.5 grams lactose, 3 grams glucose, 3 grams sodium nitrate, .5 gram magnesium sulphate, 15 grams potassium acid phosphate, .05 gram zinc sulphate, .025 gram manganous sulphate and .8 gram phenyl acetic acid. The mash was treated with .2% hydrogen peroxide by weight overnight. Catalase was added and the inoculum introduced. The growth at 24° C. and at pH 7.0 was accompanied by the introduction of hydrogen peroxide at a rate to provide .02 to .2 volume of oxygen per liter per minute. After 72 hours, the titer of penicillin G in the filter broth was 800 to 1350 units per milliliter.

*Example XII*

In the production of streptomycin, *Streptomyces griseus* was grown on a medium containing 10 grams molasses per liter, 50 grams of hydrolyzed casein, inorganic salts, and no cobalt. The medium was treated with .2% hydrogen peroxide by weight overnight. Catalase was added and the inoculum introduced. The growth of the organism at 25 to 30° C. was accompanied by the introduction of hydrogen peroxide to supply .0006 to .006 cu. ft. of oxygen per minute per gallon. After a five-day cultivation, streptomycin was present at a level of 100 micrograms per milliliter of medium.

*Example XIII*

In a process for the oxidative transformation of 11-dehydrocorticosterone, *Trichothecium roseum* was maintained in a replacement culture at 30° C. which included a substrate at a .1% level and catalase and to which was added hydrogen peroxide to supply .1 liter oxygen per liter of medium per minute. The oxidation product, cortisone, represented a yield of 4% of the product and provided a recovery of 80% of the original reactant.

*Example XIV*

The process was carried on as described in Example XIII except that the steroid was progesterone and the final product was 11-hydroxy progesterone.

While, in the foregoing specification, we have set forth specific steps and treating materials in considerable detail for the purpose of illustration, it will be understood that such details may be varied widely by those skilled in the art without departing from the spirit of our invention.

We claim:

1. In an aerobic fermentation process in which a microorganism is cultivated in a nutrient medium, the steps which comprise contacting the medium with hydrogen peroxide, thereafter adding catalase to the medium prior to cultivating the microorganism in the nutrient medium and continuing to contact the medium with hydrogen peroxide as the fermentation proceeds.

2. The process of claim 1, wherein an excess of catalase is present in the nutrient medium throughout the fermentation period.

3. In a process for the preparation of vitamin $B_{12}$ by cultivating a vitamin $B_{12}$ producing microorganism in a nutrient medium, the steps of contacting the medium with hydrogen peroxide, thereafter adding catalase to the medium prior to cultivating, the microorganism in the nutrient medium and continuing to contact the medium with hydrogen peroxide as the cultivation proceeds.

4. In a process for the preparation of riboflavin by cultivating a riboflavin producing microorganism in a nutrient medium, the steps of contacting the medium with hydrogen peroxide, thereafter adding catalase to the medium prior to cultivating, the microorganism in the nutrient medium and continuing to contact the medium with hydrogen peroxide as the cultivation proceeds.

5. In a process for the preparation of citric acid by cultivating a citric acid producing microorganism in a nutrient medium, the steps of contacting the medium with hydrogen peroxide, thereafter adding catalase to the medium prior to cultivating the microorganism in the nutrient medium and continuing to contact the medium with hydrogen peroxide as the cultivation proceeds.

6. In a process for the preparation of penicillin by cultivating a penicillin producing microorganism in a nutrient medium, the steps of contacting the medium with hydrogen peroxide, thereafter adding catalase to the medium prior to cultivating the microorganism in the nutrient medium and continuing to contact the medium with hydrogen peroxide as the cultivation proceeds.

7. In a process for the preparation of streptomycin by cultivating a streptomycin producing microorganism in a nutrient medium, the steps of contacting the medium with hydrogen peroxide, thereafter adding catalase to the medium prior to cultivating the microorganism in the nutrient medium and continuing to contact the medium with hydrogen peroxide as the cultivation proceeds.

8. In a process for the preparation of bacitracin by cultivating a bacitracin producing microorganism in a nutrient medium, the steps of contacting the medium with hydrogen peroxide, thereafter adding catalase to the medium prior to cultivating, the microorganism in the nutrient medium and continuing to contact the medium with hydrogen peroxide as the cultivation proceeds.

9. In a process for the preparation of a tetracycline by cultivating a tetracycline producing microorganism in a nutrient medium, the steps of contacting the medium with hydrogen peroxide, thereafter adding catalase to the medium prior to cultivating the microorganism in the nutrient medium and continuing to contact the medium with hydrogen peroxide as the cultivation proceeds.

10. In a process for the preparation of a steroid by cultivating a steroid producing microorganism in a nutrient medium, the steps of contacting the medium with hydrogen peroxide, thereafter adding catalase to the medium prior to cultivating the microorganism in the nutrient medium and continuing to contact the medium with hydrogen peroxide as the cultivation proceeds.

11. The process of claim 1, in which the fermentation is carried on in a closed system.

12. The process of claim 1, in which the rate of input of hydrogen peroxide is increased as the fermentation proceeds.

13. The process of claim 1, in which nutrient medium sterilized with hydrogen peroxide is added to the material undergoing fermentation as the fermentation proceeds.

14. In an aerobic fermentation process in which an inoculum is added to a nutrient medium, the steps of preliminarily sterilizing the medium by adding hydrogen peroxide thereto, thereafter adding catalase to the materials, adding an inoculum to the medium, maintaining the medium at a temperature favorable to the growth of the inoculum, and continuing to add hydrogen peroxide as the fermentation proceeds while maintaining an excess of catalase in the materials undergoing fermentation.

15. In an aerobic fermentation process carried on in a closed system and in which an inoculum is added to a nutrient medium, the steps of preliminarily sterilizing the medium by adding hydrogen peroxide thereto, thereafter adding catalase to the materials, adding an inoculum to the medium, maintaining the medium at a temperature favorable to the growth of the inoculum, and continuing to add hydrogen peroxide as the fermentation proceeds while maintaining an excess of catalase in the materials undergoing fermentation.

16. In an aerobic fermentation process in which a yeast inoculum is added to a nutrient medium in a closed system, the steps of adding catalase to the medium, thereafter adding yeast inoculum to the material, maintaining the material under temperature conditions favorable to the growth of the yeast, and adding hydrogen peroxide to the materials undergoing fermentation as the fermentation proceeds.

17. The process of claim 16, in which the hydrogen peroxide is added at about .66 grams per liter per hour.

18. The process of claim 16, in which the hydrogen peroxide is added initially in the amount of .2% to 1% by weight.

19. In an aerobic fermentation process in which an inoculum is added to a nutrient medium, the steps of adding hydrogen peroxide to the medium to sterilize the same, thereafter adding catalase, adding an inoculum to the medium, continuing to add hydrogen peroxide as the fermentation proceeds, and continuing to add nutrient medium containing hydrogen peroxide as the fermentation proceeds.

20. In an aerobic fermentation process in which an inoculum is added to a nutrient medium in a closed system, the steps of adding hydrogen peroxide to the medium to sterilize the same, thereafter adding catalase, adding an inoculum to the medium, continuing to add hydrogen peroxide as the fermentation proceeds, and continuing to add nutrient medium containing hydrogen peroxide as the fermentation proceeds.

21. The process of claim 19, in which the hydrogen peroxide is added at an increasing rate of input as the fermentation proceeds.

References Cited in the file of this patent

UNITED STATES PATENTS

| | | |
|---|---|---|
| 779,637 | Budde | Jan. 10, 1905 |
| 1,727,223 | Van Loon | Sept. 3, 1929 |
| 2,218,336 | Kokatmur | Oct. 15, 1940 |
| 2,473,630 | Barreto | June 21, 1949 |
| 2,602,769 | Murray et al. | July 8, 1952 |
| 2,793,162 | Thomas | May 21, 1957 |
| 2,824,044 | Miescher et al. | Feb. 18, 1958 |

OTHER REFERENCES

Chemical Abstracts, 1940, vol. 34, pages 1124 to 1125.